United States Patent
Stray et al.

(10) Patent No.: US 11,422,393 B2
(45) Date of Patent: Aug. 23, 2022

(54) ELECTRO-OPTIC DEVICE WITH WIRE EMBEDDED IN AN ADHESIVE SEAL

(71) Applicant: GENTEX CORPORATION, Zeeland, MI (US)

(72) Inventors: Joel A. Stray, Hudsonville, MI (US); William L. Tonar, Holland, MI (US); David A. Bender, Holland, MI (US); Luke W. Koops, Zeeland, MI (US); Christopher M. Derry, Allegan, MI (US); Tammy G. Morgan, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 563 days.

(21) Appl. No.: 16/512,758

(22) Filed: Jul. 16, 2019

(65) Prior Publication Data

US 2020/0026102 A1    Jan. 23, 2020

Related U.S. Application Data

(60) Provisional application No. 62/699,757, filed on Jul. 18, 2018.

(51) Int. Cl.
*G02F 1/155* (2006.01)
*G02F 1/01* (2006.01)
(Continued)

(52) U.S. Cl.
CPC .......... *G02F 1/0107* (2013.01); *E06B 3/6722* (2013.01); *H01R 4/04* (2013.01); *H01R 4/58* (2013.01); *H01R 4/70* (2013.01)

(58) Field of Classification Search
CPC ........ G02F 1/0107; G02F 1/0102; G02F 1/15; G02F 1/153; G02F 1/155; G02F 1/161
See application file for complete search history.

(56) References Cited

U.S. PATENT DOCUMENTS

5,379,146 A * 1/1995 Defendini ............... G02F 1/155
                                                              359/275
6,449,082 B1 * 9/2002 Agrawal ................. G02F 1/155
                                                              359/275
(Continued)

FOREIGN PATENT DOCUMENTS

JP    2014106282 A    6/2014

OTHER PUBLICATIONS

International Search Report dated Oct. 17, 2019, for corresponding PCT application No. PCT/US2019/041931, 3 pages.
(Continued)

*Primary Examiner* — Joseph P Martinez
(74) *Attorney, Agent, or Firm* — Price Heneveld LLP; Brian James Brewer

(57) ABSTRACT

An electro-optic device comprises a first substrate having a first surface, a second surface, and an outer perimeter edge; a second substrate having a third surface, a fourth surface, and an outer perimeter edge, the third surface of the second substrate being opposed to the second surface of the first substrate; a chamber defined between the second surface of the first substrate and the opposed third surface of the second substrate; a first electrode coating disposed on the second surface of the first substrate; a second electrode coating disposed on the third surface of the second substrate; a first conductive or semi-conductive material disposed on and extending longitudinally along at least a portion of a peripheral area of the first substrate and in electrical communication with the first electrode coating; and a non-conductive material extending between the first conductive or semi-conductive material and the second electrode coating.

16 Claims, 4 Drawing Sheets

(51) Int. Cl.
  *H01R 4/04* (2006.01)
  *E06B 3/67* (2006.01)
  *H01R 4/58* (2006.01)
  *H01R 4/70* (2006.01)

(56) References Cited

U.S. PATENT DOCUMENTS

| | | |
|---|---|---|
| 6,795,226 B2 * | 9/2004 | Agrawal ........... B32B 17/10174 |
| | | 359/254 |
| 7,349,143 B2 | 3/2008 | Tonar et al. |
| 2021/0079716 A1 * | 3/2021 | Neander ............... E06B 3/6722 |

OTHER PUBLICATIONS

Written Opinion of the International Searching Authority dated Oct. 17, 2019, for corresponding PCT application No. PCT/US2019/041931, 6 pages.

* cited by examiner

ELECTRO-OPTIC DEVICE WITH WIRE EMBEDDED IN AN ADHESIVE SEAL

CROSS-REFERENCE TO RELATED APPLICATIONS

This application claims priority under 35 U.S.C. § 119 to U.S. Provisional Application No. 62/699,757, filed Jul. 18, 2018, entitled "Electro-Optic Device with Wire Embedded in an Adhesive Seal," which is hereby incorporated by reference in its entirety.

FIELD OF THE DISCLOSURE

This disclosure relates generally to bus bars for electro-optic devices and in particular to high-conductivity bus bars.

BACKGROUND

Many current electro-optic devices use a silver epoxy adhesive as a sealing member between the first and second substrates. The silver epoxy adhesive allows voltage to travel from a bus to an electrically conductive material coating the first and second substrates of the device. The electrical conductivity through the silver epoxy sealing member is limited by, among other things, the thickness and width of the sealing member and the volume and density of silver in the sealing member.

SUMMARY

According to some aspects, an electro-optic device comprises a first substrate having a first surface, a second surface, and an outer perimeter edge, a second substrate having a third surface, a fourth surface, and an outer perimeter edge, the third surface of the second substrate being opposed to the second surface of the first substrate; a chamber defined between the second surface of the first substrate and the opposed third surface of the second substrate; a first electrode coating disposed on the second surface of the first substrate; a second electrode coating disposed on the third surface of the second substrate; a first conductive or semi-conductive material disposed on and extending longitudinally along at least a portion of a peripheral area of the first substrate and in electrical communication with the first electrode coating; and a non-conductive material extending between the first conductive or semi-conductive material and the second electrode coating. The first conductive or semi-conductive material may comprise a surface portion disposed on and extending along at least a portion of a peripheral area of the first electrode coating, and a perimeter portion extending longitudinally along at least a portion of the outer perimeter edge of the first substrate. The electro-optic device further may comprise at least one first conductive wire embedded in at least one of the perimeter portion and the surface portion of the first conductive or semi-conductive material, the at least one first conductive wire extending longitudinally along at least a portion of the first conductive or semi-conductive material. The wire may have a diameter less than about 0.006 inch. The wire may have a diameter between 0.003 and 0.005 inch. The electro-optic device may further comprise a second conductive or semi-conductive material disposed along at least a portion of a peripheral area of the second substrate and in electrical communication with the second electrode coating; wherein the second conductive or semi-conductive material may be at least partially opposed to the first conductive or semi-conductive material; wherein the non-conductive material may extend between the opposed parts of the first conductive or semi-conductive material and the second conductive or semi-conductive material, and is configured to electrically isolate the first conductive or semi-conductive material from the second conductive or semi-conductive material. The electro-optic device may further comprise at least one first conductive wire embedded in the first conductive or semi-conductive material, the at least one first conductive wire extending generally longitudinally along at least a portion of the first conductive or semi-conductive material; and at least one second conductive wire embedded in the second conductive or semi-conductive material, the at least one second conductive wire extending generally longitudinally along at least a portion of the second conductive or semi-conductive material. The non-conductive material may comprise a narrow portion and a wider portion; wherein the narrow portion extends between the first conductive or semi-conductive material and the second electrode coating and is configured to electrically isolate the first conductive or semi-conductive material from the second electrode coating, wherein the wider portion extends beyond the first conductive or semi-conductive material toward the chamber; and wherein the wider portion extends from the first electrode coating to the second electrode coating. The wider portion of the non-conductive material may define at least a portion of a sidewall of the chamber.

According to some aspects, an electro-optic device may comprise a first substrate having a first surface and a second surface, and a second substrate having a third surface and a fourth surface, the third surface being opposed to the second surface; a chamber defined between the second surface of the first substrate and the opposed third surface of the second substrate, a first electrode coating disposed on the second surface of the first substrate; a second electrode coating disposed on the third surface of the second substrate; a first conductive or semi-conductive material disposed on and extending along at least a portion of a peripheral area of the first electrode coating; a second conductive or semi-conductive material disposed on and extending along at least a portion of a peripheral area of the second electrode coating, wherein at least part of the first conductive or semi-conductive material is opposed to at least part of the second conductive or semi-conductive material; and a non-conductive material extending between the first conductive or semi-conductive material and the second electrode coating, wherein the non-conductive material is configured to electrically isolate the first conductive or semi-conductive material from the second electrode coating. The non-conductive material may extend between the opposed parts of the first conductive or semi-conductive material and the second conductive or semi-conductive material; and the non-conductive material may be configured to electrically isolate the first conductive or semi-conductive material from the second conductive or semi-conductive material. The electro-optic device may further comprise at least one first conductive wire, the at least one first conductive wire disposed in the first conductive or semi-conductive material; and the at least one first conductive wire may extend longitudinally along at least a part of the first conductive or semi-conductive material. The electro-optic device may further comprise at least one second conductive wire, the at least one second conductive wire disposed in the second conductive or semi-conductive material, and the at least one second conductive wire may extend longitudinally along at least a part of the second conductive or semi-conductive material.

According to some aspects, a bus bar assembly for an electro-optic device may comprise a first conductive or semi-conductive material disposed along a peripheral area of a first electrode coating of a first substrate of the electro-optic device; at least one first wire embedded in and extending longitudinally along at least a portion of the first conductive or semi-conductive material; and a non-conductive material extending between the first conductive or semi-conductive material and a second electrode coating of a second substrate of the electro-optic device, wherein the second electrode coating is opposed to the first electrode coating. The non-conductive material may be configured to electrically isolate the first conductive or semi-conductive material from the second electrode coating. The bus bar assembly may further comprise a second conductive or semi-conductive material disposed along a peripheral area of the second electrode coating of the electro-optic device; and at least one second wire embedded in and extending longitudinally along at least a portion of the second conductive or semi-conductive material; wherein the non-conductive material is configured to electrically isolate the first conductive or semi-conductive material from the second conductive or semi-conductive material. The bus bar assembly may further comprise at least one second wire, the at least one second wire embedded in and extending longitudinally along at least a portion of the second conductive or semi-conductive material. At least a portion of the first conductive or semi-conductive material may be opposed to at least a portion of the second conductive or semi-conductive material; and the non-conductive material may extend between the opposed portions of the first and second conductive or semi-conductive materials, electrically isolating them from one another. The non-conductive material may extend beyond the first and second conductive or semi-conductive materials and toward a chamber of the electro-optic device; and the portion of the non-conductive material that extends beyond the first and second conductive or semi-conductive materials may extend from the first electrode coating to the second electrode coating, defining at least a portion of a sidewall of the chamber. The first conductive or semi-conductive material has a portion extending along a portion of an outer perimeter edge of the first substrate; and the second conductive or semi-conductive material may have a portion extending along a portion of an outer perimeter edge of the second substrate.

DETAILED DESCRIPTION

Figure 1:
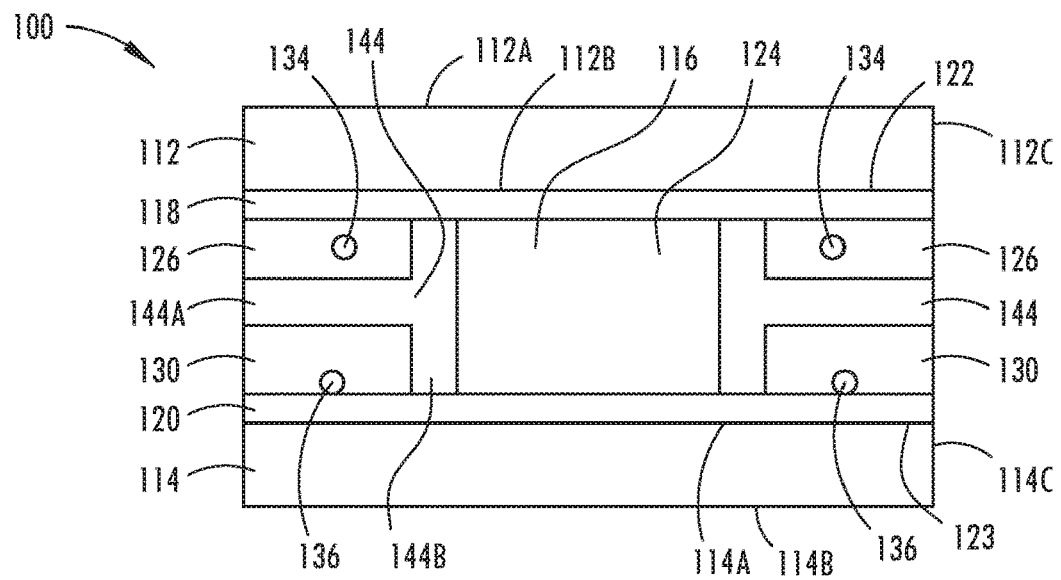
FIG. 1 is a cross-sectional schematic representation of a portion of an electro-optic device showing conductive or semi-conductive material and embedded wires on opposing surfaces of the device in accordance with the present disclosure.

Using a thicker layer of silver epoxy as a sealing member between the first and second substrates in an electro-optic device may improve conductivity, but it may also increase the spacing between the first and second substrates, thereby requiring a thicker layer of electro-optic medium in the device Increasing the thickness of the electro-optic medium may result in longer clearing and darkening times, which may be undesirable. In addition, a thicker sealing member will require more silver, and thus will be more costly. Similarly, increasing the width of the silver epoxy adhesive in the device may increase the amount of silver and thereby improve conductivity, but will also increase the expense associated with the silver. Furthermore, since the silver epoxy adhesive is generally hidden under structures surrounding the device, a wider epoxy adhesive layer will be more difficult to hide.

Increasing the proportion of the silver in the epoxy may provide higher conductivity and consequent better performance of the electro-optic cell. However, increasing the proportion of silver may be costly. Furthermore, because the silver in the epoxy may be in the form of silver particles, there may be practical limitations on the proportion of silver that can be included in the epoxy and in the conductivity that can be achieved. Insufficient conductivity, especially for larger devices such as larger electro-optic windows and sun roofs, may result in slower responses for clearing and darkening. Furthermore, the devices may exhibit problems with shading, in which the change in color of the device may move from one side or edge of the device to another, when darkening or clearing.

Using silver epoxy as a sealing member requires adding isolation lines or zones or some other feature on the first and second substrates for directing voltage to the appropriate electrode and preventing the device from short circuiting. The isolation lines may be produced through an additional manufacturing step, such as etching, either mechanically or with a laser, ablating, sandblasting, or other mechanical means of removing layers of electrically conductive material or electrode coatings on each of the first and second substrates.

FIGS. 1-7 show cross-sectional schematic representations of embodiments of an electro-optic (EO) device 100. Electro-optic device 100 generally comprises a first substrate 112 having a first surface 112A, a second surface 11212B, and an outer perimeter edge 112C, a second substrate 114 having a third surface 114A, a fourth surface 114B, and an outer perimeter edge 114C, and a chamber 116 defined between second surface 112B and third surface 114A for containing an electro-optic medium 124.

One or more layers of electrically conductive material or electrode coatings 118 may be associated with and disposed on second surface 112B of first substrate 112. These layers may serve as a first electrode for electro-optic device 100. Similarly, one or more layers of electrically conductive material or electrode coatings 120 may be associated with and disposed on third surface 114A of second substrate 114, and may operate as a second electrode for electro-optic device 100. Electrode coatings 118, 120 may be materials that: (a) are substantially transparent in the visible region of the electromagnetic spectrum; (b) bond reasonably well to first substrate 112; (c) maintain this bond when associated with a sealing member; (d) are generally resistant to corrosion from materials contained within electro-optic device 100 or the atmosphere; and (e) exhibit minimal diffusion or specular reflectance as well as sufficient electrical conductance. Electrode coatings 118, 120 may be fabricated from fluorine doped tin oxide (FTO), indium/tin oxide (ITO), doped zinc oxide or other materials known to those having ordinary skill in the art. When voltage is applied to electro-optic medium 124 through electrode coatings 118, 120, electro-optic medium 124 may be capable of changing properties such that light traveling therethrough is attenuated.

In some embodiments, a first conductive or semi-conductive material 126 may be disposed longitudinally along at least a portion of a peripheral area 122 of second surface 112B of first substrate 112 as shown in FIGS. 1-11. In some embodiments, a second conductive or semi-conductive material 130 may be disposed longitudinally along at least a portion of a peripheral area 123 of third surface 114A of second substrate 114. First conductive or semi-conductive material 126 may be in electrical contact with the one or more layers of electrode coatings 118 on second surface 112B, and second conductive or semi-conductive material 130 may be in electrical contact with the one or more layers of electrode coatings 120 on third surface 114A. First and second conductive or semi-conductive materials 126, 130 may act as bus bars for the EO device 100.

Figure 2:
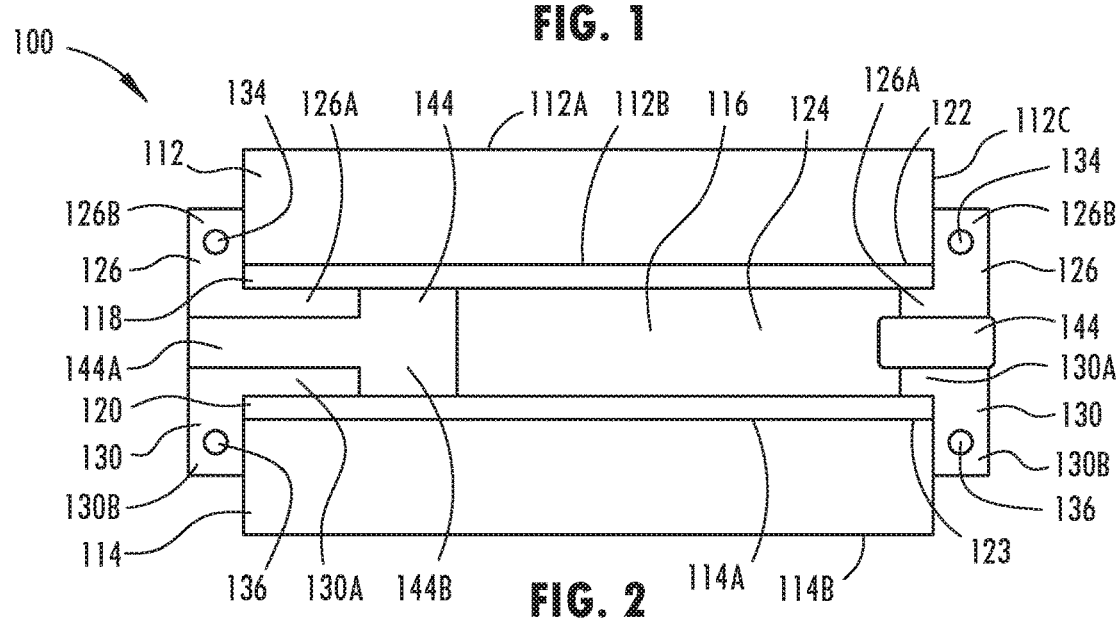
FIG. 2 is a cross-sectional schematic representation of a portion of an electro-optic device showing conductive or semi-conductive material and embedded wires on opposing surfaces and perimeter edge portions of opposed substrates in accordance with the present disclosure.
Figure 3:
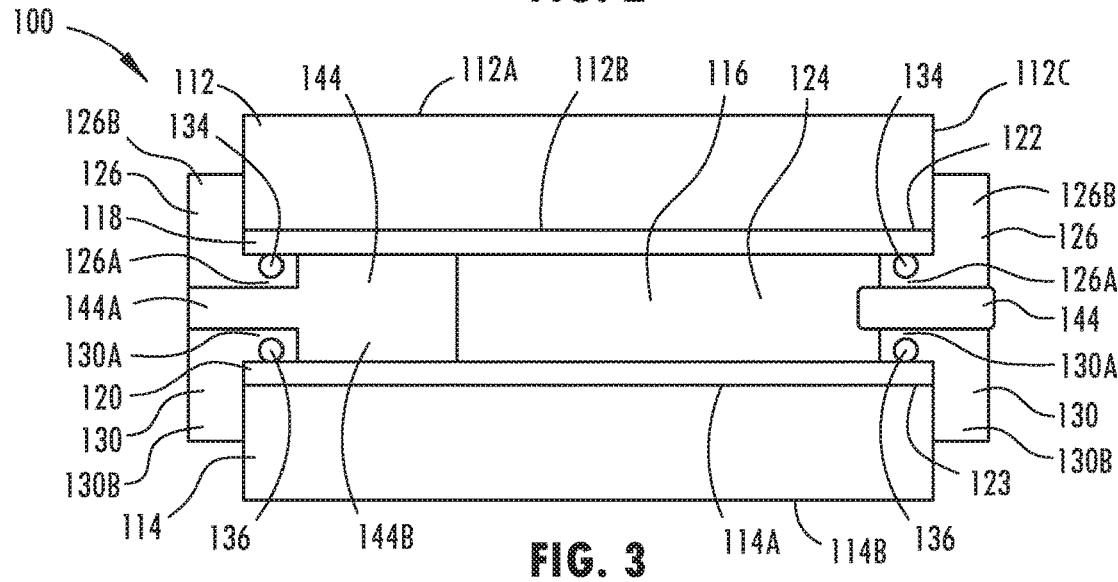
FIG. 3 is a cross-sectional schematic representation of a portion of an electro-optic device showing conductive or semi-conductive material on opposing surfaces and perimeter edge portions of the substrates, and wires embedded in the conductive or semi-conductive material on the opposing surfaces in accordance with the present disclosure.

In some embodiments, as shown in FIGS. 2 and 3, first conductive or semi-conductive material 126 may comprise a surface portion 126A and a perimeter portion 126B. Surface portion 126A of first conductive or semi-conductive material 126 may extend longitudinally along at least a portion of peripheral area 122 of second surface 112B to outer perimeter edge 112C. Surface portion 126A of first conductive or semi-conductive material 126 may be in electrical contact with the one or more layers of electrode coatings 118 associated with second surface 112B. Perimeter portion 126B of first conductive or semi-conductive material 126 may be disposed longitudinally along at least a portion of outer perimeter edge 112C of first substrate 112.

Similarly, in some embodiments, second conductive or semi-conductive material 130 may comprise a surface portion 130A and a perimeter portion 130B. Surface portion 130A of second conductive or semi-conductive material 130 may extend longitudinally along at least a portion of peripheral area 123 of third surface 114A to outer perimeter edge 114C, and may be in electrical contact with the one or more layers of electrode coatings 120 associated with third surface 114A. Perimeter portion 130B of first conductive or semi-conductive material 126 may be disposed along at least a portion of outer perimeter edge 114C of second substrate 114.

Figure 8:
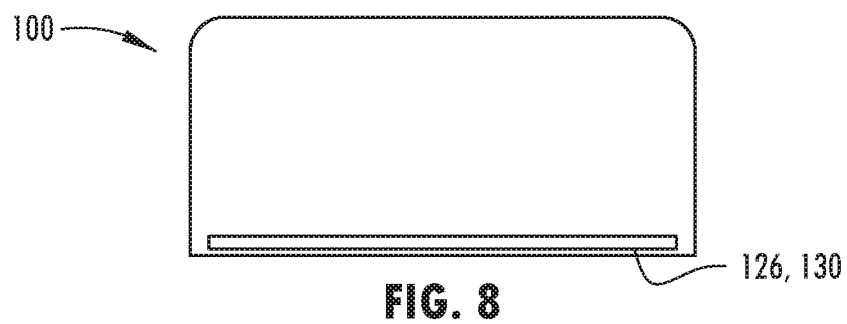
FIG. 8 is a front view of an embodiment of a first arrangement of conductive or semi-conductive material of an electro-optic device in accordance with the present disclosure.
Figure 9:
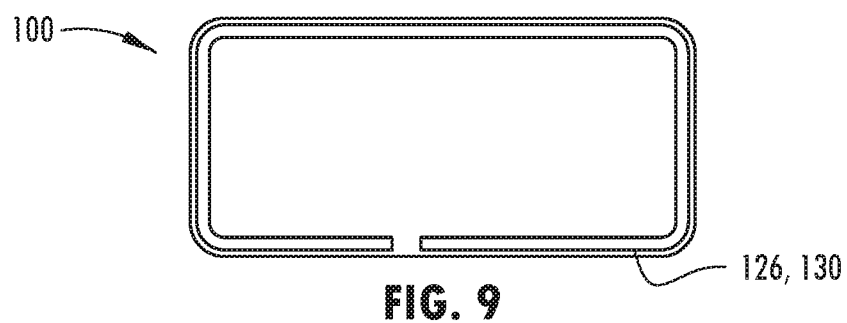
FIG. 9 is a front view of an embodiment of a second arrangement of conductive or semi-conductive material of an electro-optic device in accordance with the present disclosure.

In some embodiments, such as, for example, a heads-up display, first conductive or semi-conductive material 126 may extend along only one side or a portion of one side of EO device 100, as shown in FIG. 8. In some embodiments, first and second conductive or semi-conductive materials 126, 130 may extend along portions of at least two sides of peripheral areas 122, 123 of EO device 100. In some embodiments, such as in some larger windows, sun roofs, or other larger EO devices, first and second conductive or semi-conductive materials 126, 130 may extend along substantially the entire perimeter of second and third surfaces 112B, 114A respectively of EO device 100 as shown in FIG. 9. In some embodiments, EO device 100 may be rounded, oval, an irregular shape without well-defined sides or a polygon with more or fewer than four sides; and first and second conductive or semi-conductive materials 126, 130 may extend longitudinally along at least a portion of peripheral areas 122, 123 of second surface 112B of first substrate 112 and third surface 114A of second substrate 114 respectively.

Figure 10:
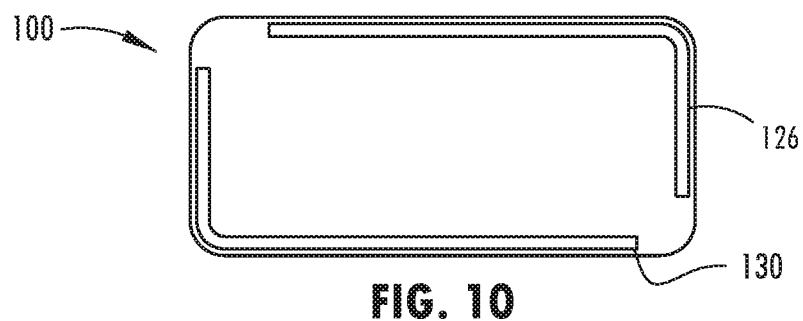
FIG. 10 is a front view of an embodiment of a third arrangement of conductive or semi-conductive material of an electro-optic device in accordance with the present disclosure.
Figure 11:
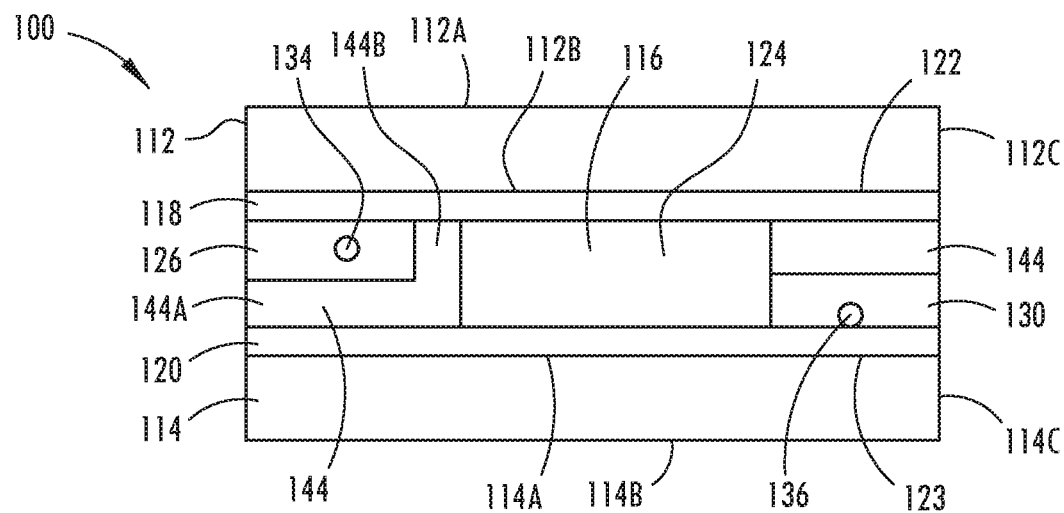
FIG. 11 is a cross-sectional schematic representation of a portion of an electro-optic device showing conductive or semi-conductive material on only one surface of the device in accordance with the present disclosure.

In some embodiments, first conductive or semi-conductive material 126 on peripheral area 122 of second surface 112B may be disposed on opposing surfaces from second conductive or semi-conductive material 130 on peripheral area 123 of third surface 114A as shown in FIGS. 8 and 9. In some embodiments, first conductive or semi-conductive material 126 may be disposed on a first portion of peripheral area 122 of second surface 112B, and second conductive or semi-conductive material 130 may be disposed on a second portion of peripheral area 123 of third surface 114A different from the respective first portion of peripheral area 122 of second surface 112B as shown in FIGS. 10 and 11. For example, in an EO device 100 having four sides, first conductive or semi-conductive material 126 may be disposed longitudinally along at least a portion of first and second sides of second surface 112B, while second conductive or semi-conductive material 130 may be disposed longitudinally along at least a portion of third and fourth sides of peripheral area 123 of third surface 114A.

First conductive or semi-conductive material 126 may be the same as or different from second conductive or semi-conductive material 130. First and second conductive or semi-conductive materials 126, 130 may be, for example, silver epoxies, silver or other conductive inks, carbon inks, metal-containing thermoplastic or thermosetting polymers, metal oxides, conductive pressure sensitive adhesive (PSA), or an epoxy comprising conductive particles, flakes, or fibers made of materials such as silver, gold, copper, nickel, or carbon. Other suitable materials for first and second conductive or semi-conductive materials 126, 130 include chromium, stainless steel, titanium, and alloys of chromium/molybdenum/nickel, molybdenum, and nickel-based alloys.

In some embodiments, at least one first wire 134 may be embedded in first conductive or semi-conductive material 126 on second surface 112B of first substrate 112 as shown in FIG. 1. The at least one first wire 134 may extend longitudinally along at least a portion of peripheral area 122 of second surface 112B, and may extend as far along or substantially as far along peripheral area 122 as does first conductive or semi-conductive material 126. In some embodiments, at least one first wire 134 may be embedded in surface portion 126A of first conductive or semi-conductive material 126 associated with first substrate 112, as shown in FIG. 3. The at least one first wire 134 may be in contact with first electrode coating 118 as shown in the lower portion of FIG. 1, or may be encased in first conductive or semi-conductive material 126 as shown in the upper portion of FIG. 1. Additionally or alternatively, the at least one first wire 134 may be embedded in perimeter portion 126B of first conductive or semi-conductive material 126, and may extend longitudinally along at least a portion of outer perimeter edge 112C of first substrate 112, as shown in FIG. 2. In some embodiments, at least one first wire 134 may be embedded in surface portion 126A of material 126 and at least one first wire 134 may be embedded in perimeter portion 126B of material 126. In some embodiments, at least one first wire 134 may be in contact with outer perimeter edge 112C of first substrate 112 or may be encased within surface portion 126A or perimeter portion 126B of first conductive or semi-conductive material 126.

Similarly, in some embodiments, at least one second wire 136 may be embedded in second conductive or semi-conductive material 130 on third surface 114A of second substrate 114, and may extend longitudinally along at least a portion of peripheral area 123 of third surface 114A, as shown in FIG. 1. The at least one second wire 136 may extend longitudinally along or substantially as far along peripheral area 123 of second substrate 114 as does second conductive or semi-conductive material 130. The at least one second wire 136 may be in either surface portion 130A or perimeter portion 130B of second conductive or semi-conductive material 130. In some embodiments, more than one second wire 136 may be embedded in second conductive or semi-conductive material 126, with at least one wire 136 embedded in surface portion 130A of material 130 and at least one wire 136 embedded in perimeter portion 130B of material 130. In some embodiments, at least one second wire 136 may be in contact with electrode coating 120 on second substrate 114 as shown in the lower portion of FIG. 1. Additionally or alternatively, at least one second wire 136 may be encased in second conductive or semi-conductive material 130, as shown in the top portion of FIG. 1.

Figure 4:
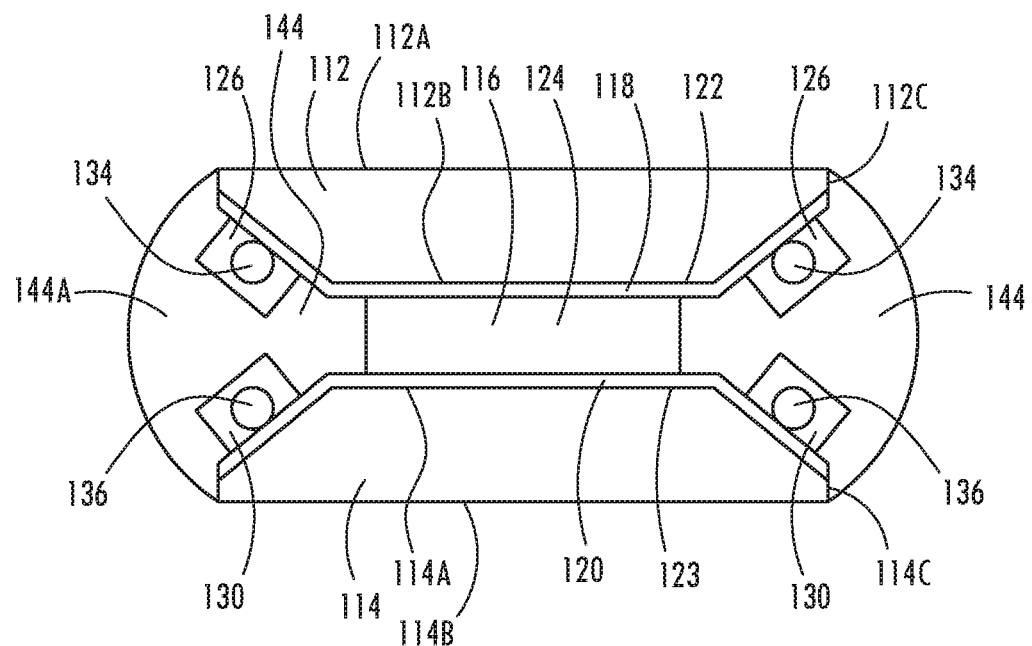
FIG. 4 is a cross-sectional representation of a portion of an electro-optic device showing conductive or semi-conductive material and embedded wires on beveled surfaces of the device in accordance with the present disclosure.
Figure 5:
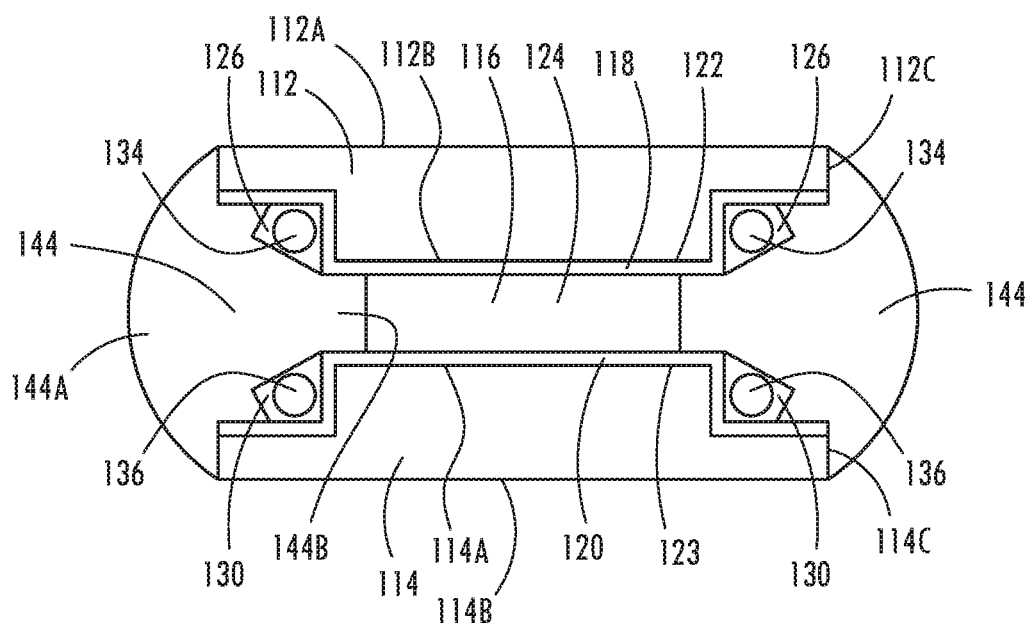
FIG. 5 is a cross-sectional representation of a portion of an electro-optic device showing conductive or semi-conductive material and embedded wires on notched surfaces of the device in accordance with the present disclosure.
Figure 6:
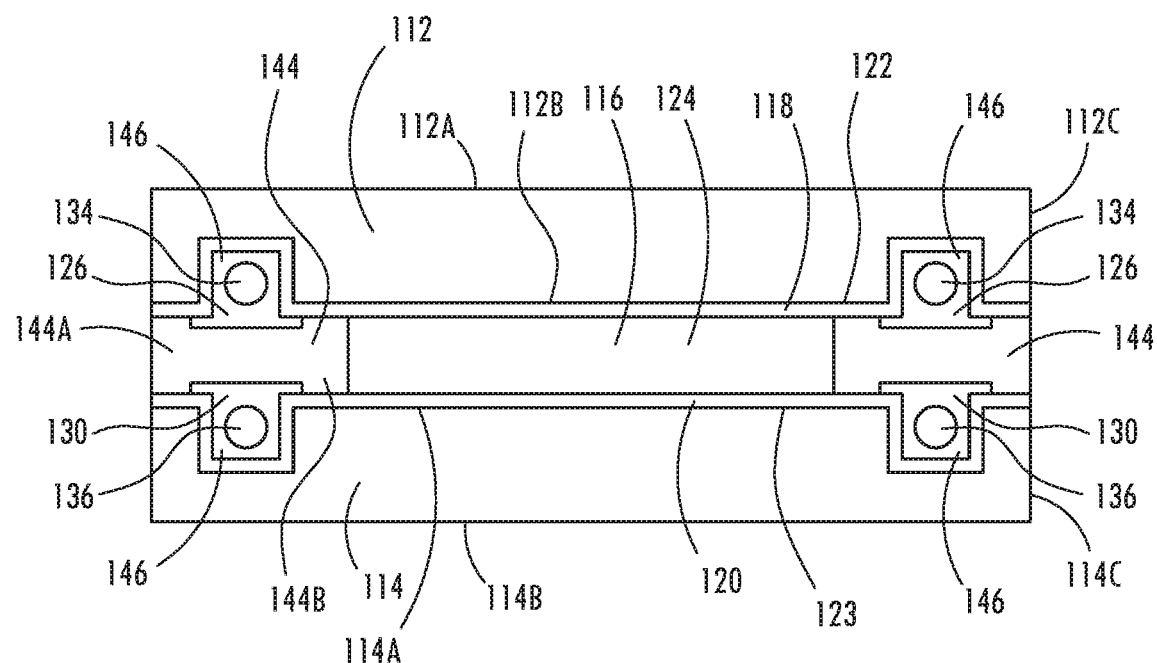
FIG. 6 is a cross-sectional representation of a portion of an electro-optic device showing conductive or semi-conductive material and embedded wires disposed in channels recessed into surfaces of the device in accordance with the present disclosure.
Figure 7:
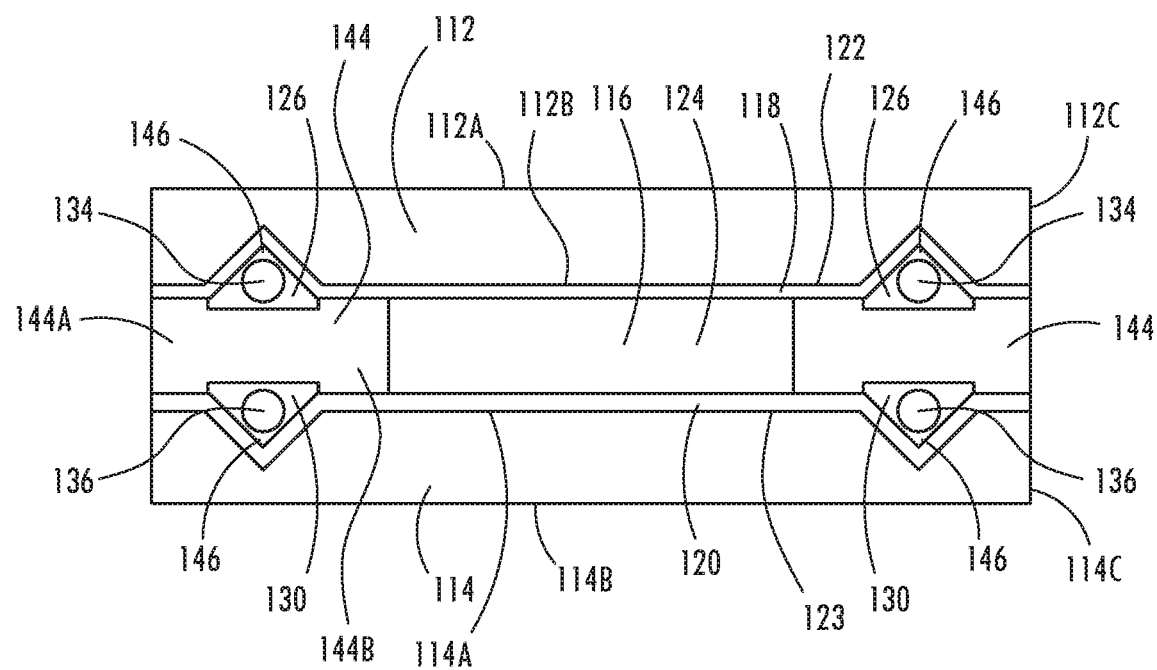
FIG. 7 is a cross-sectional representation of a portion of an electro-optic device showing conductive or semi-conductive material and embedded wires disposed in channels recessed into surfaces of the device in accordance with the present disclosure.

In some embodiments, the at least one first and second wires 134, 136 may be disposed in first or second conductive or semi-conductive material 126, 130 respectively. At least one of first and second conductive or semi-conductive material 126, 130 may be disposed on a beveled edge of at least one of first and second substrates 112, 114 respectively as shown in FIG. 4. In some embodiments, at least one of first and second conductive or semi-conductive material 126, 130 may be disposed on a notched edge of at least one of first and second substrates 112, 114 respectively as shown in FIG. 5. In some embodiments, at least one of first and second conductive or semi-conductive material 126, 130 may be disposed in a channel 146 recessed into at least one of second surface 112B of first substrate 112 and third surface 114A of second substrate 114 as shown in FIGS. 6 and 7.

In some embodiments, the at least one first and second wires 134, 136 may be disposed in first or second conductive or semi-conductive material 126, 130 respectively in a generally longitudinal direction along at least a portion of peripheral area 122, 123 respectively. The at least one first and second wires may include some curves, arcs, bends, or other deviations Without the deviations in the path of the at least one first and second wires 134, 136, differences in coefficients of thermal expansion of the at least one of first and second wires 134, 136 and the underlying materials may result in wire breakage during temperature changes. However, the deviations in the path of the at least one of first and second wires 134, 136 may allow at least one of first and second wires to expand or contract independently of the underlying materials without breakage of the at least one first and second wire 134, 136.

In some embodiments, the at least one first and second wires 134, 136 may comprise a wire having a generally circular cross-section. In some embodiments, the at least one first and second wires 134, 136 may comprise a wire comprising multiple strands. In some embodiments, the at least one first and second wires 134, 136 may comprise a multi-strand wire having a plurality of wire strands surrounding a wire core. In some embodiments, the wire core may be of a larger cross-section than each of the plurality of wire strands. In some embodiments, the at least one first and second wires 134, 136 may comprise a ribbon having a generally rectangular cross-section. In some embodiments, the at least one first and second wires 134, 136 may be configured as a braided ribbon, with a plurality of separate strands making up the wire ribbon.

The at least one first and second wires 134, 136 may be of any conductive material such as copper, aluminum, silver, or gold. In some embodiments, first and second wires 134, 136 may be coated with a conductive material, such as a tin-plated wire. Wires 134, 136 may be a first conductive metal coated with a second conductive metal, such as tin-coated copper wire. Metal or metal-clad wires may be more conductive than silver epoxy. This higher conductivity may allow the production of larger windows. It also may allow the reduction or elimination of silver epoxy in windows. Other conductive or semi-conductive materials may work in conjunction with wires 134, 136 to transfer voltage to the desired location, thereby reducing or eliminating the need to use silver epoxy in windows. In some embodiments, first and second wires 134, 136 may comprise a doped semiconductor.

In some embodiments, at least one of first and second wires 134, 136 may be plated or clad with a sufficient amount of material to change the linear thermal expansion of the wire. For example, a molybdenum wire may be plated with copper or a copper wire may be plated with molybdenum. The thermal expansion of the at least one of first and second wires 134, 136 may be adjusted by varying the thickness of the wire and of the plating material. This may reduce strain and the possibility of breakage of the at least one of first and second wires 134, 136 upon temperature changes.

The at least one first and second wires 134, 136 may be sufficiently strong to be unlikely to break while being applied to substrate 112, 114 during the manufacturing process. First and second wires 134, 136 may also be sufficiently pliable to remain in place on surface of substrate after being applied without pulling away from substrates 112, 114 or first and second conductive or semi-conductive material 126, 130. First and second wires 134, 136 may have a diameter, and the diameter may be less than 0.01 inches.

In some embodiments, the diameters of wires 134, 136 may be less than 0.006 inches. In some embodiments, the diameters of wires 134, 136 may be between 0.003 and 0.005 inches.

In some embodiments, for example, in larger devices, the spacing between first and second substrates 112, 114 may be 1 mm or more. That may allow for first and second wires 134, 136 to have larger thicknesses or diameters, possibly as wide or thick as 0.02 inches. In some embodiments, the wires may comprise multiple strands. In some embodiments, first and second wires 134, 136 may provide a resistance of less than 2 ohms per foot. In some embodiments, wires may provide a resistance of less than 1 ohm per foot, and may provide a resistance of less than 0.5 ohms per foot.

Embedding the at least one first and second wires 134, 136 in perimeter portions 126B, 130B of first and second conductive or semi-conductive materials 126, 130 may allow thinner cell spacing between first and second substrates 112, 114. In embodiments having at least one first and second wire 134, 136 disposed within conductive or semi-conductive materials 126, 130 on second and third surfaces 112B, 114A respectively may require the cell spacing to be at least as thick as the wires 134, 136 disposed within the layers. Thus, the minimum thickness for the cell spacing may be at least twice the diameter of wires 134, 136. Positioning first and second wires 134, 136 on outer perimeter edges 112C, 114C of first and second substrates 112, 114 rather than between first and second substrates 112, 114 may reduce the required thickness of the layers of first and second conductive or semi-conductive material 126, 130. In some embodiments, the thickness of layers of first and second conductive or semi-conductive material 126, 130 may be less than the thickness of first and second wires 134, 136. Thickness of first and second conductive or semi-conductive materials may be less than 0.01 inches, less than 0.006 inches, or between 0.005 inches and 0.003 inches inclusive.

In some embodiments, a non-electrically-conductive material may extend between opposing first and second conductive or semi-conductive materials 126, 130, electrically isolating them one from another, as shown in the right sides of FIGS. 1-3.

In some embodiments, as shown in the left sides of the drawings in FIGS. 1-7, a non-conductive material 144 may comprise a narrow portion 144A and a wider portion 144B. Narrow portion 144A may extend between first conductive or semi-conductive material 126 and second conductive or semi-conductive material 130, electrically isolating them from one another. Wider portion 144B of non-conductive material 144 may extend beyond the at least one first and second conductive or semi-conductive materials 126, 130 toward chamber 116 of EO device 100. Wider portion 144B may extend from and be in contact with both electrode coating 118 disposed on second surface 112B and electrode coating 120 disposed on third surface 114A. Wider portion 144B may function as a seal or a portion of a seal for chamber 116 and, in some embodiments, the inner edge of wider portion 144B may define at least a portion of a sidewall of chamber 116. In some embodiments, non-conductive material 144 may extend only longitudinally along generally the same portion of peripheral areas 122, 123 of EO device 100 as at least one of first and second conductive or semi-conductive materials 126, 130, and a sealing member (not shown) may seal the remaining periphery of chamber 116. In some embodiments, non-conductive material 144 may act as the sealing member.

In some embodiments, at least a portion of a side-wall of chamber 116 may be defined by the inner edges of first and second electrode coatings 118, 120 and an inner edge of non-conductive material 144, as shown in FIGS. 1-7.

In some embodiments, first conductive or semi-conductive material 126 may extend longitudinally along only a portion of peripheral area 122 of second surface 112B, and second conductive or semi-conductive material 130 may extend longitudinally along only a portion of peripheral area 123 of third surface 114A. The portion of peripheral area 122 of second surface 112B having first conductive or semi-conductive material 126 may not coincide with the portion of peripheral area 123 of third surface 114A having second conductive or semi-conductive material 130, as shown in FIGS. 10 and 11. A narrow portion 144A of non-conductive material 144 may extend between first conductive or semi-conductive material 126 and layer of electrode coating 120, thereby electrically isolating first conductive or semi-conductive material 126 from electrode coating 120. Additionally or alternatively, a narrow portion 144A of non-conductive material 144 may extend between second conductive or semi-conductive material 130 and layer of electrode coating 118, electrically isolating second conductive or semi-conductive material 130 and electrode coating 118 from one another as shown in the right side of the drawing in FIG. 11. In some embodiments, there may be two separate non-conductive materials, one extending between first conductive or semi-conductive material 126 and layer of electrode coating 120, and one extending between second conductive or semi-conductive material 130 and layer of electrode coating 118. Thus, first conductive or semi-conductive material is electrically isolated from electrode coating 120 and second conductive or semi-conductive material 130 is electrically isolated from electrode coating 118.

In some embodiments, non-conductive material 144 may have both a narrow portion 144A and a wider portion 114B as shown in the left side of the drawing in FIG. 11. Narrow portion 144A may extend between first conductive or semi-conductive material 126 and layer of electrode coating 120 associated with second substrate 114 or between second conductive or semi-conductive material 130 and layer of electrode coating 118 associated with first substrate 112. Wider portion 144B may extend from and be in contact with layer of electrode coating 118 associated with first substrate 112 and layer of electrode coating 120 associated with second substrate 114.

Non-conductive material 144 may comprise any non-conductive material that is capable of being adhesively bonded to electrode coatings 118, 120. In some embodiments, non-conductive material 144 may comprise a thermoplastic or thermosetting polymeric system. Examples include 2-part epoxy systems, rubbers, urethanes, acrylates, and the like. U.S. Pat. No. 6,157,480, filed Sep. 21, 1998, entitled Improved Seal for Electrochromic Devices, the entire disclosure of which is hereby incorporated herein by reference. Non-conductive material 144 may be fabricated from any one of a number of materials including, for example, those disclosed in U.S. Pat. No. 4,297,401, entitled "Liquid Crystal Display and Photopolymerizable Sealant Therefor," filed Dec. 26, 1978; U.S. Pat. No. 4,418,102, entitled "Liquid Crystal Displays Having Improved Hermetic Seal," filed May 14, 1981; U.S. Pat. No. 4,695,490, entitled "Seal For Liquid Crystal Display," filed Oct. 15, 1985; U.S. Pat. No. 5,596,023, entitled "Sealing Material For Liquid Crystal Display Panel, and Liquid Crystal Display Panel Using It," filed Feb. 22, 1995; U.S. Pat. No. 5,596,024, entitled "Sealing Composition For Liquid Crystal," filed Apr. 18, 1995, U.S. Pat. No. 6,157,480 entitled "Seal For Electrochromic Devices." filed Jun. 9, 1980; U.S.

Pat. No. 6,714,334, entitled "Electrochromic Device Having A Seal Including An Epoxy Resin Cured With A Cycloaliphatic Amine," filed Jan. 27, 2003, and U.S. Pat. No. 9,676,334, entitled "Clear Bezel," filed Oct. 16, 2016, all of which are hereby incorporated herein by reference in their entirety.

After curing, non-conductive material 144 may be capable of maintaining a generally fixed shape and configuration. When non-conductive material 144 functions as a seal, it should preferably not be permeable to water or oxygen in any significant degree, and should be generally inert to electro-optic material disposed in chamber 116. Non-conductive material 144 should not interact with or poison electro-optic medium 124 in chamber 116. Because of their excellent adhesion to glass, low oxygen permeability and good solvent resistance, epoxy-based organic sealing resins may be used. Because of their lower processing temperatures, thermoplastic, thermosetting or UV curing organic sealing resins may be preferred. The epoxy resins may be UV curing, thermally curing such as mixtures of liquid epoxy resin with liquid polyamide resin or dicyandiamide, or homopolymerized. Because of their excellent adhesion to glass, low oxygen permeability and good solvent resistance, epoxy-based organic sealing resins are preferred. The epoxy resin may contain fillers or thickeners to reduce flow and shrinkage such as fumed silica, silica, mica, clay, calcium carbonate, alumina, etc., and/or pigments to add color. Additives such as silanes, titanates, or sulfur or phosphorous compounds can be used to improve the seal's hydrolytic stability and adhesion. Suitable epoxy resins for use as a non-conductive material 144 include, but are not limited to: "EPON RESIN" 813, 825, 826, 828, 830, 834, 862, 1001F, 1002F, 2012, DPS-155, 164, 1031, 1074, 58005, 58006, 58034, 58901, 871, 872, and DPL-862 available from Shell Chemical Co., Houston, Tex.; "ARALITE" GY 6010, GY 6020, CY 9579, GT 7071. XU 248, EPN 1139, EPN 1138, PY 307, ECN 1235, ECN 1273, ECN 1280, MT 0163, MY 720, MY 0500, MY 0510, and PT 810 available from Ciba Geigy, Hawthorne, N.Y.; and "D.E.R." 331, 317, 361, 383, 661, 662, 667, 732, 736, "D.E.N." 354, 354LV, 431, 438, 439 and 444 available from Dow Chemical Co., Midland, Mich. Suitable epoxy curing agents include V-15, V-25, and V-40 polyamides from Shell Chemical Co.; "AJICURE" PN-23, PN-34, and VDH available from Ajinomoto Co., Tokyo, Japan; "CUREZOL" AMZ, 2MZ, 2E4MZ, C11Z. C17Z, 2PZ, 21Z, and 2P4MZ available from Shikoku Fine Chemicals, Tokyo, Japan; "ERISYS" DDA or DDA accelerated with U-405, 24EMI, U1-410, and U-415 available from CVC Specialty Chemicals, Maple Shade, N.J.; and "AMICURE" PACM, 2049, 352, CG. CG-325, and CG-1200 available from Air Products, Allentown, Pa. Suitable fillers include fumed silica such as "CAB-O-SIL" L-90, LM-130, LM-5, PTG, M-5, MS-7, MS-55, TS-720, HS-5, and EH-5 available from Cabot Corporation, Tuscola, Ill., "AEROSIL" R972, R974, R805, R812, R812 S, R202, US204, and US206 available from Degussa. Akron, Ohio. Suitable clay fillers include BUCA. CATALPO, ASP NC, SATINTONE 5, SATINTONE SP-33. TRANSLINK 37, TRANSLINK 77. TRANSLINK 445, and TRANSLINK 555 available from Engelhard Corporation, Edison, N.J. Suitable silica fillers are SILCRON G-130, G-300, G-100-T, and G-100 available from SCM Chemicals, Baltimore, Md. Suitable silane coupling agents to improve hydrolytic stability are Z-6020, Z-6030, Z-6032, Z-6040, Z-6075, and Z-6076 available from Dow Corning Corporation, Midland, Mich. Non-conductive material 144 may be constructed in accordance with the teachings in U.S. Pat. Nos. 5,790,298 and 6,157,480, the entire disclosures of which are incorporated herein by reference.

To facilitate adhesion between non-conductive material 144 and electrode coatings 118, 120 on first and second substrates 112, 114, one or more adhesion promoters may optionally be included in at least one of non-conductive material 144 or electrode coatings 118, 120. Adhesion promoters may comprise a resin base coating applied to at least one of first and second substrates 112, 114. Adhesion promoters may include silanes or silane coupling agents such as Dow Corningr Z-6121 and/or Dow Corning® Xiameter OF S-6032. It will be understood that although several examples are provided herein, other adhesion promoters may be used without departing from the spirit of the disclosure. The adhesion promoter used may be selected based at least in part on electrode coating 118, 120, conductive or semi-conductive and non-conductive material 144 used.

First and second conductive or semi-conductive materials 126, 130 may each direct voltage to the appropriate first or second electrode coatings 118, 120. Non-conductive material 144 disposed between first and second electrode coatings 118, 120 or between first or second electrode coatings 118, 120 and second or first conductive or semi-conductive material 130, 126 respectively may prevent voltage from travelling directly between second surface 112B and third surface 114A, thus preventing EO device 100 from short circuiting. Therefore, isolation lines or isolation zones may not be required for operation of EO device 100 configured in accordance with this disclosure. Isolation lines or zones are generally linear areas extending along at least a portion of peripheral area 122, 123 of at least one of second and third surfaces 112B, 114A and from which electrode coating 118, 120 has been removed. The isolation lines allow voltage to be directed to electrode coatings 118, 120 on first and second substrates 112, 114 while not short circuiting EO device 100, and they prevent voltage from travelling directly from a first electrode coating to a second electrode coating. Eliminating the necessity for isolation lines may reduce the steps, time, and costs of manufacturing EO devices.

The above description is considered that of the preferred embodiments only Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It should be noted that references to "front," "back," "rear," "upward," "downward," "inner," "outer," "right," and "left" in this description are merely used to identify the various elements as they are oriented in the FIGURES. These terms are not meant to limit the element which they describe, as the various elements may be oriented differently in various applications.

The invention claimed is:

1. An electro-optic device comprising:
   a first substrate having a first surface, a second surface, and an outer perimeter edge;
   a second substrate having a third surface, a fourth surface, and an outer perimeter edge, the third surface of the second substrate being opposed to the second surface of the first substrate;
   a chamber defined between the second surface of the first substrate and the opposed third surface of the second substrate;

a first electrode coating disposed on the second surface of the first substrate;

a second electrode coating disposed on the third surface of the second substrate;

a first conductive or semi-conductive material disposed on and extending longitudinally along at least a portion of a peripheral area of the first substrate and in electrical communication with the first electrode coating, wherein the first conductive or semi-conductive material comprises a surface portion disposed on and extending along at least a portion of a peripheral area of the first electrode coating, and a perimeter portion extending longitudinally along at least a portion of the outer perimeter edge of the first substrate;

a non-conductive material extending between the first conductive or semi-conductive material and the second electrode coating; and at least one first conductive wire embedded in at least one of the perimeter portion and the surface portion of the first conductive or semi-conductive material, the at least one first conductive wire extending longitudinally along at least a portion of the first conductive or semi-conductive material.

2. The electro-optic device of claim 1, wherein the wire has a diameter less than about 0.006 inch.

3. The electro-optic device of claim 2, wherein the wire has a diameter between 0.003 and 0.005 inch.

4. The electro-optic device of claim 1, further comprising a second conductive or semi-conductive material disposed along at least a portion of a peripheral area of the second substrate and in electrical communication with the second electrode coating;

wherein the second conductive or semi-conductive material is at least partially opposed to the first conductive or semi-conductive material;

wherein the non-conductive material extends between the opposed parts of the first conductive or semi-conductive material and the second conductive or semi-conductive material, and is configured to electrically isolate the first conductive or semi-conductive material from the second conductive or semi-conductive material.

5. The electro-optic device of claim 4, further comprising at least one first conductive wire embedded in the first conductive or semi-conductive material, the at least one first conductive wire extending generally longitudinally along at least a portion of the first conductive or semi-conductive material; and at least one second conductive wire embedded in the second conductive or semi-conductive material, the at least one second conductive wire extending generally longitudinally along at least a portion of the second conductive or semi-conductive material.

6. The electro-optic device of claim 1, wherein the non-conductive material comprises a narrow portion and a wider portion;

wherein the narrow portion extends between the first conductive or semi-conductive material and the second electrode coating and is configured to electrically isolate the first conductive or semi-conductive material from the second electrode coating;

wherein the wider portion extends beyond the first conductive or semi-conductive material toward the chamber; and wherein the wider portion extends from the first electrode coating to the second electrode coating.

7. The electro-optic device of claim 6, wherein the wider portion of the non-conductive material defines at least a portion of a sidewall of the chamber.

8. An electro-optic device comprising:

a first substrate having a first surface and a second surface, and a second substrate having a third surface and a fourth surface, the third surface being opposed to the second surface;

a chamber defined between the second surface of the first substrate and the opposed third surface of the second substrate;

a first electrode coating disposed on the second surface of the first substrate;

a second electrode coating disposed on the third surface of the second substrate;

a first conductive or semi-conductive material disposed on and extending along at least a portion of a peripheral area of the first electrode coating;

a second conductive or semi-conductive material disposed on and extending along at least a portion of a peripheral area of the second electrode coating, wherein at least part of the first conductive or semi-conductive material is opposed to at least part of the second conductive or semi-conductive material;

a non-conductive material extending between the first conductive or semi-conductive material and the second electrode coating;

at least one first conductive wire, the at least one first conductive wire disposed in the first conductive or semi-conductive material, wherein the at least one first conductive wire extends longitudinally along at least a part of the first conductive or semi-conductive material; and at least one second conductive wire, the at least one second conductive wire disposed in the second conductive or semi-conductive material, wherein the at least one second conductive wire extends longitudinally along at least a part of the second conductive or semi-conductive material;

wherein the non-conductive material is configured to electrically isolate the first conductive or semi-conductive material from the second electrode coating.

9. The electro-optic device of claim 8, wherein the non-conductive material extends between the opposed parts of the first conductive or semi-conductive material and the second conductive or semi-conductive material; and wherein the non-conductive material is configured to electrically isolate the first conductive or semi-conductive material from the second conductive or semi-conductive material.

10. A bus bar assembly for an electro-optic device comprising:

a first conductive or semi-conductive material disposed along a peripheral area of a first electrode coating of a first substrate of the electro-optic device;

at least one first wire embedded in and extending longitudinally along at least a portion of the first conductive or semi-conductive material; and a non-conductive material extending between the first conductive or semi-conductive material and a second electrode coating of a second substrate of the electro-optic device;

wherein the second electrode coating is opposed to the first electrode coating.

11. The bus bar assembly for an electro-optic device of claim 10, wherein the non-conductive material is configured to electrically isolate the first conductive or semi-conductive material from the second electrode coating.

12. The bus bar assembly of claim 10, further comprising a second conductive or semi-conductive material disposed along a peripheral area of the second electrode coating of the electro-optic device;
and at least one second wire embedded in and extending longitudinally along at least a portion of the second conductive or semi-conductive material;
wherein the non-conductive material is configured to electrically isolate the first conductive or semi-conductive material from the second conductive or semi-conductive material.

13. The bus bar assembly of claim 12, further comprising at least one second wire, the at least one second wire embedded in and extending longitudinally along at least a portion of the second conductive or semi-conductive material.

14. The bus bar assembly of claim 12, wherein at least a portion of the first conductive or semi-conductive material is opposed to at least a portion of the second conductive or semi-conductive material; and
wherein the non-conductive material extends between the opposed portions of the first and second conductive or semi-conductive materials, electrically isolating them from one another.

15. The bus bar assembly of claim 12, wherein the non-conductive material extends beyond the first and second conductive or semi-conductive materials and toward a chamber of the electro-optic device; and
wherein the portion of the non-conductive material that extends beyond the first and second conductive or semi-conductive materials extends from the first electrode coating to the second electrode coating, defining at least a portion of a sidewall of the chamber.

16. The bus bar assembly of claim 12, wherein the first conductive or semi-conductive material has a portion extending along a portion of an outer perimeter edge of the first substrate; and
wherein the second conductive or semi-conductive material has a portion extending along a portion of an outer perimeter edge of the second substrate.

* * * * *